(12) United States Patent
Huang

(10) Patent No.: US 6,678,074 B1
(45) Date of Patent: Jan. 13, 2004

(54) CHANGEABLE RESOLUTION APPARATUS AND METHOD FOR OPTICAL SCANNER

(75) Inventor: Chih-Wen Huang, Hsinchu (TW)

(73) Assignee: Umax Data Systems, Inc. (TW)

( * ) Notice: Subject to any disclaimer, the term of this patent is extended or adjusted under 35 U.S.C. 154(b) by 628 days.

(21) Appl. No.: 09/684,105

(22) Filed: Oct. 6, 2000

(51) Int. Cl.[7] ................................................ H04N 1/04
(52) U.S. Cl. ...................... 358/474; 358/475; 358/483; 358/486; 358/471
(58) Field of Search .............................. 358/474, 471, 358/486.487, 497, 494, 483, 482, 400, 475, 505, 506, 509, 512–514; 250/234–236, 208.1; 382/312; 399/211; 318/696, 685; 359/821, 210, 672, 813

(56) References Cited

U.S. PATENT DOCUMENTS

| | | | | | |
|---|---|---|---|---|---|
| RE30,231 E | * | 3/1980 | Ikeda | ........................... | 359/672 |
| 5,532,846 A | * | 7/1996 | Brook et al. | ................ | 358/497 |
| 5,712,720 A | * | 1/1998 | Peng et al. | .................. | 359/210 |
| 5,734,477 A | * | 3/1998 | Tsai | ............................ | 358/296 |
| 5,883,727 A | * | 3/1999 | Tsai | ............................ | 358/475 |
| 5,969,845 A | * | 10/1999 | Tsai | ............................ | 359/210 |
| 6,075,584 A | * | 6/2000 | Tsai | ............................ | 355/18 |
| 6,084,230 A | * | 7/2000 | Tsai | ....................... | 250/208.1 |
| 6,163,387 A | * | 12/2000 | Han | ........................... | 358/487 |
| 6,424,433 B1 | * | 7/2002 | Miyauchi et al. | ........... | 358/471 |
| 6,577,410 B1 | * | 6/2003 | Tsai | ............................ | 358/474 |
| 6,587,247 B2 | * | 7/2003 | Huang | ....................... | 359/215 |

* cited by examiner

Primary Examiner—Cheukfan Lee

(57) ABSTRACT

A changeable resolution apparatus and method for scanner includes two rotational disks which have respectively a plurality of lenses of different focuses and a plurality of charge-coupled devices (CCD) of different resolutions located therein. A motor is provided to drive a transmission shaft to rotate in a positive or a reverse direction. Two one-way shaft bearings are engaged with the transmission shaft to drive the rotational disks one-way in opposite directions for changing lens and CCD combination to reach different resolutions. The apparatus is located in the scanner for users to adjust scanner resolution based on scanning requirements to get optimum resolution result.

13 Claims, 5 Drawing Sheets

CHANGEABLE RESOLUTION APPARATUS AND METHOD FOR OPTICAL SCANNER

BACKGROUND OF THE INVENTION

1. Field of the Invention

The present invention relates to optical scanner that has two rotation disks to respectively carry a plurality of different lenses and Charge-Coupled Devices (CCD) for adjusting resolution by changing lens and CCD combination so that users may select different resolutions to meet different scanning requirements.

2. Description of the Prior Art

Optical technology innovation in the past century has spawned numerous optical products to benefit human being, ranging from spectacles, telescope, to conventional or digital camera, copy machine, monitor and scanner. Scanner is an important optical device nowadays. It can scan important image or text data files into computer. Then image and data may be processed or edited for display or presentation use. It saves a lot of data input and process time. Scanner quality and value highly depends on its resolution. Conventional scanner usually has only one lens and one CCD for scanning in a selected resolution. Such a design and structure has severely limited its application and usefulness. When there is a need for scanning of different resolutions, different sets of scanner equipped with different resolutions will be needed. Users have to invest a lot more money to acquire many different scanners. Scanning operation is more difficult to arrange and become less efficient. Scanner manufacturers have to design and produce a lot more different scanners to meet market needs. It adds more research and development costs. All this begs for improvement.

SUMMARY OF THE INVENTION

The present invention aims at resolving a common problem existed in conventional scanners which have only one set of optical focusing means and cannot provide scanning for documents of various resolutions. The present invention offers a novel structure to attack the deficiency of conventional scanners. The scanner according to the present invention has an additional transmission motor attached with a transmission gear for driving a transmission shaft. The transmission shaft has two one-way shaft bearings mounted thereon. At any one time, only one set of the one-way shaft bearings may receive force and turn when driven in a positive or reverse direction. The two one-way shaft bearings engage with the gears of two rotational disks. The rotational disks have respectively a center engaged with a spindle through a one-way spindle bearing. The spindle has one end fixedly engaged with an inner wall of the scanner. A first rotational disk has a plurality of lenses located thereon. A second rotational disk has a plurality of CCD located thereon. When the motor rotates in positive or reverse direction, the two disks may be turned respectively at two opposite directions (one clockwise, another counterclockwise) to adjust relative position between each other such that the lens and CCD may be aligned to different combinations. Then focus of different resolutions may be obtained for users to choose the optimum combination to suit their requirements.

In one aspect, the lenses on the first rotational disk may have different focuses. The first rotational disk may be turned to position a lens on the optical path to pair with a stationary CCD for obtaining a selected resolution.

In another aspect, each CCD has different resolution. And the second rotational disk may be turned to move a selected CCD on the optical path to pair with a stationary lens for obtaining an optimum focus.

BRIEF DESCRIPTION OF THE DRAWINGS

The invention, as well as its many advantages, may be further understood by the following detailed description and drawings, in which.

DETAILED DESCRIPTION OF THE PREFERRED EMBODIMENTS

The optical scanner according to the present invention includes a first and second rotational disk. The first rotational disk has a plurality of lenses of different focuses located therein. The second rotational disk has a plurality of CCD of different resolutions located therein. There is a motor which has a transmission gear at a front end thereof to drive a transmission shaft to rotate in positive or reverse direction. The transmission shaft has two one-way shaft bearings mounted thereon for engaging respectively with the first and second rotational disk such that the two rotational disks may be turned in opposite directions. When the motor is rotating in positive or reverse direction, only one set of the one-way shaft bearings will be driven to turn. Through bi-directional rotation of the motor, different combination of the lenses and CCD may be obtained for adjusting different resolutions. Then based on users requirements for different scanning resolutions, the changeable resolution apparatus in the scanner may be adjusted. Electronic circuits in the scanner then may be triggered to figure out rotational position of the rotational disks for getting a corresponding lens and CCD required. The motor will be driven to make the necessary adjustment.

Figure 1:
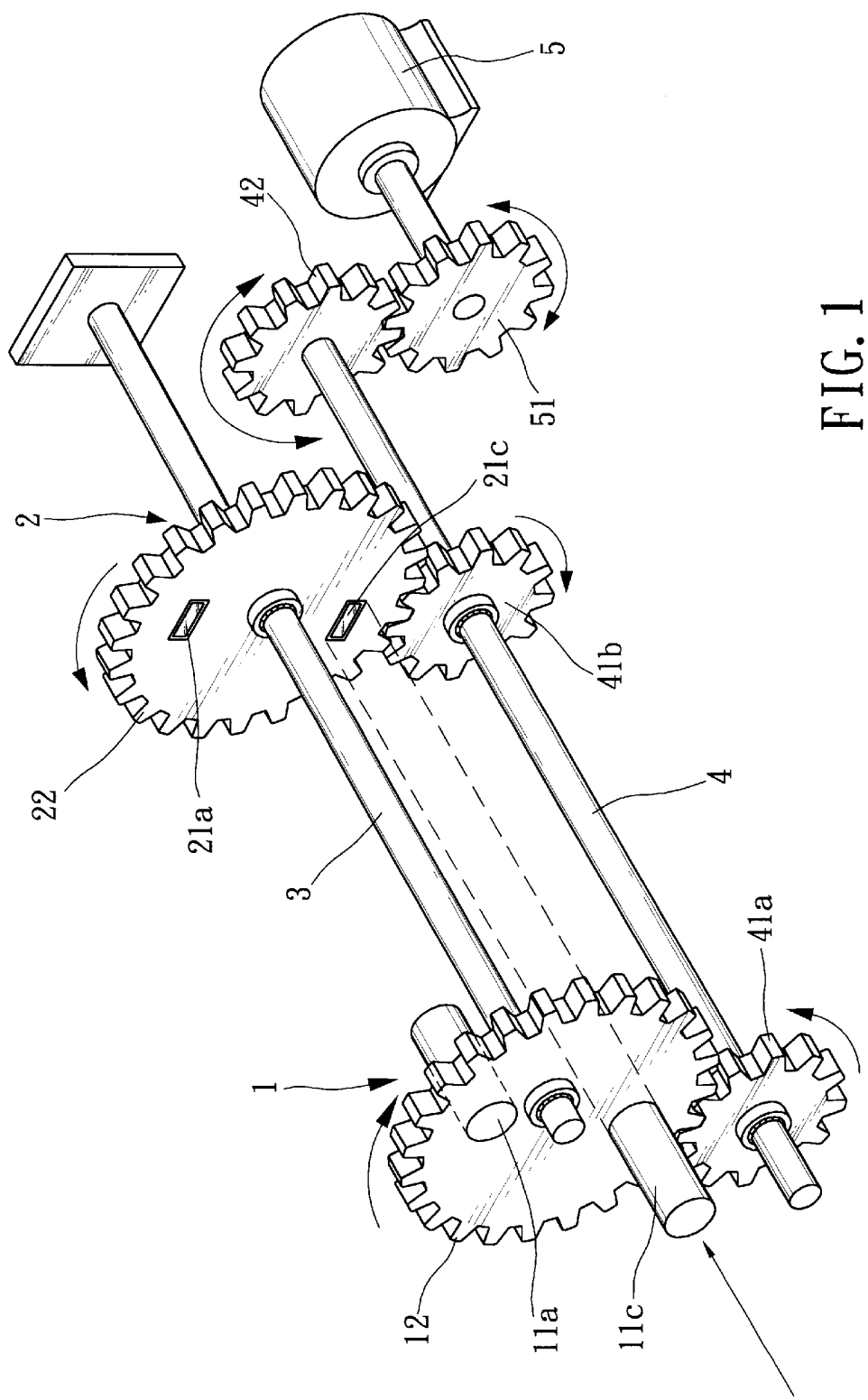
FIG. 1 is a perspective view of the present invention.
Figures 3, 4:
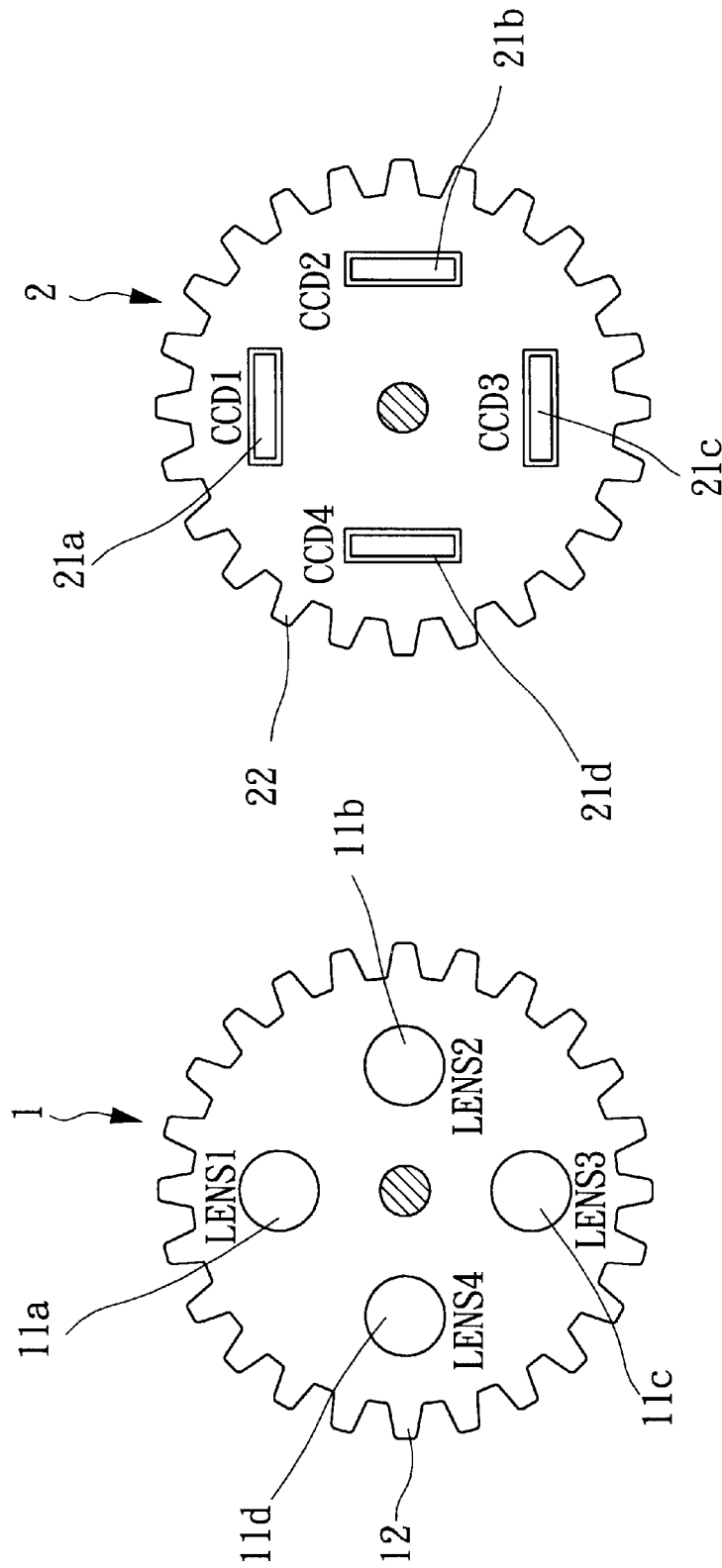
FIG. 3 is schematic front view of the first rotational disk having a plurality of lenses of different focuses located therein.
FIG. 4 is schematic front view of the second rotational disk having a plurality of CCD of different resolutions located therein.

Referring to FIG. 1, the changeable resolution apparatus according to the present invention includes a first rotational disk 1, a second rotational disk 2, a spindle 3, a transmission shaft 4 and a motor 5. The first rotational disk 1 (also shown in FIG. 3) has a plurality of lenses 11a, 11b, 11c and 11d located therein in an annular manner and a plurality of first gear teeth 12 formed at the outer rim thereof. The lenses have different focuses. The first rotational disk 1 may be turned for adjusting a selected lens on the optical path.

The second rotational disk 2 (also shown in FIG. 4) has a plurality of CCD 21a, 21b, 21c and 21d located therein in an annular manner and a plurality of second gear teeth 22 formed at the outer rim thereof. The CCD has different resolutions. The second rotational disk 1 may be turned for adjusting a selected CCD on the optical path.

The spindle 3 has one end fixedly engaged with an inner wall of the scanner casing and another end run through the centers of the first and second rotational disk 1 and 2. The centers of the first and second rotational disk engage respectively with a one-way spindle bearing (unmarked in the figures) for mounting on the spindle 3. The two one-way spindle bearings have opposite rotation directions for the first and second rotational disk 1 and 2 to rotate respectively in opposite directions.

The transmission shaft 4 has two one-way shaft bearings 41a and 41b mounted thereon and are engageable respectively with the outer rims of the first and second rotational disk 1 and 2. The shaft bearings 41a and 41b have opposite rotation directions. The transmission shaft 4 has one end attached to a shaft gear 42 for engaging with a transmission gear 51 located in front of he motor 5.

The motor 5, once energized, may drive the transmission shaft 4 to rotate clockwise or counter clockwise through the transmission gear 51 and shaft gear 42.

Hence, when the motor 5 rotates upon receiving instructions from a control circuit located in the scanner, the transmission shaft 4 will be driven to turn in one direction, consequently drives one of the shaft bearings (41a or 41b) to rotate in one direction.

Figure 2:
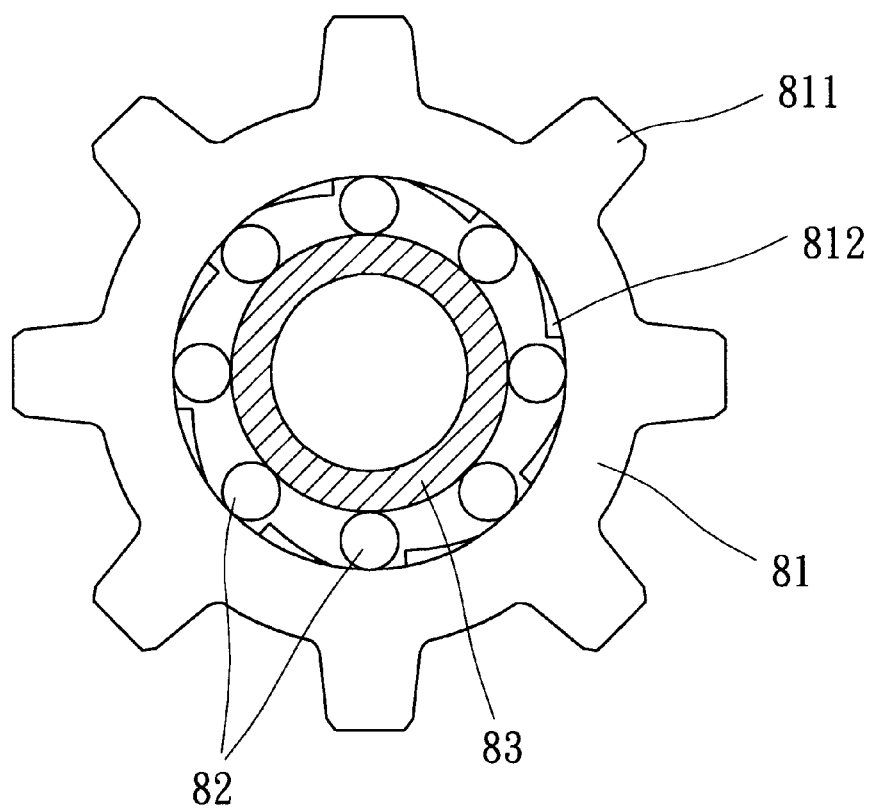
FIG. 2 is a front end sectional view of a one-way bearing of the present invention.

FIG.2 shows the structure of the one-way shaft bearing 41a and 41b. It includes an inner tube 83 housed in an outer tube 81 with a plurality of rollers 82 located therebetween. The inner tube 83 has a center bore fixedly engages with the transmission shaft 4. The outer tube 81 has an inner perimeter surface attached with a plurality of taper wedge members 812. Each roller 82 is located between two adjacent wedge members 812. The outer tube 81 further has a plurality of gear teeth 811 for engaging with first gear teeth 12 or second gear teeth 22. When the inner tube 83 is driven by the transmission shaft 4 and rotates in clockwise direction, the rollers 82 will roll and be retained by a wider edge of the wedge member 812 without squeezing or engaging with the outer tube 81. Thus the outer tube 81, gear teeth 811 and the rotational disk being engaged will remain stationary when the transmission shaft 4 is turning. On the other hand, when the transmission shaft 4 drives the inner tube 83 rotating in counter clockwise direction, the rollers 82 will be moved and wedged in the narrower gap formed between the taper surface of the wedge member 812 and inner tube 83 outside circumference to form an engaged and latched condition. Then the outer tube 81 will be dragged and turn in counter clockwise direction as the inner tube 83 does. Through such an arrangement, the transmission shaft 4 and inner tube 83 may be turned in both directions (driven by the motor 5), while the out tube 81 and the rotation disk being engaged may be turned only in one direction.

The one-way shaft bearing 41a and 41b are mounted on the shaft 4 in opposite turning directions. Hence when the motor 5 rotates in clockwise direction to drive the first rotational disk 1, the second rotational disk 2 will remain stationary. By the same token, when the motor 5 rotates in counter clockwise direction to turn the second rotational disk 2, the first rotational disk 1 will remain stationary.

As the lenses 11a, 11b, 11c and 11d are located in the first rotational disk 1 in an annular manner, turning the first rotational disk 1 may move one of the lenses (such as lens 11a) on the optical path of the scanner to pair with a selected CCD (such as 21a) to produce a selected resolution. Hence by turning the first rotational disk 1, different lenses (out of 11a, 11b, 11c and 11d) may be moved and positioned to pair with a selected CCD (such as 21a) for obtaining different combinations of resolution. By the same token, the first rotational disk 1 may be set stationary to position a selected lens (such as 11a) on the optical path, then actuating the motor 5 to rotate the second rotational disk 2 to move and position different CCDs (out of 21a, 21b, 21c and 21d) to pair with the selected lens for obtaining different resolutions desired. If necessary, the first rotational disk 1 may be turned again to placed another lens (such as 11b, 11c or 11d) to pair with any of the CCDs 21a, 21b, 21c and 21d. Through this arrangement, a wide range of resolutions may be obtained and may greatly expand its applications and usefulness.

Figure 5:
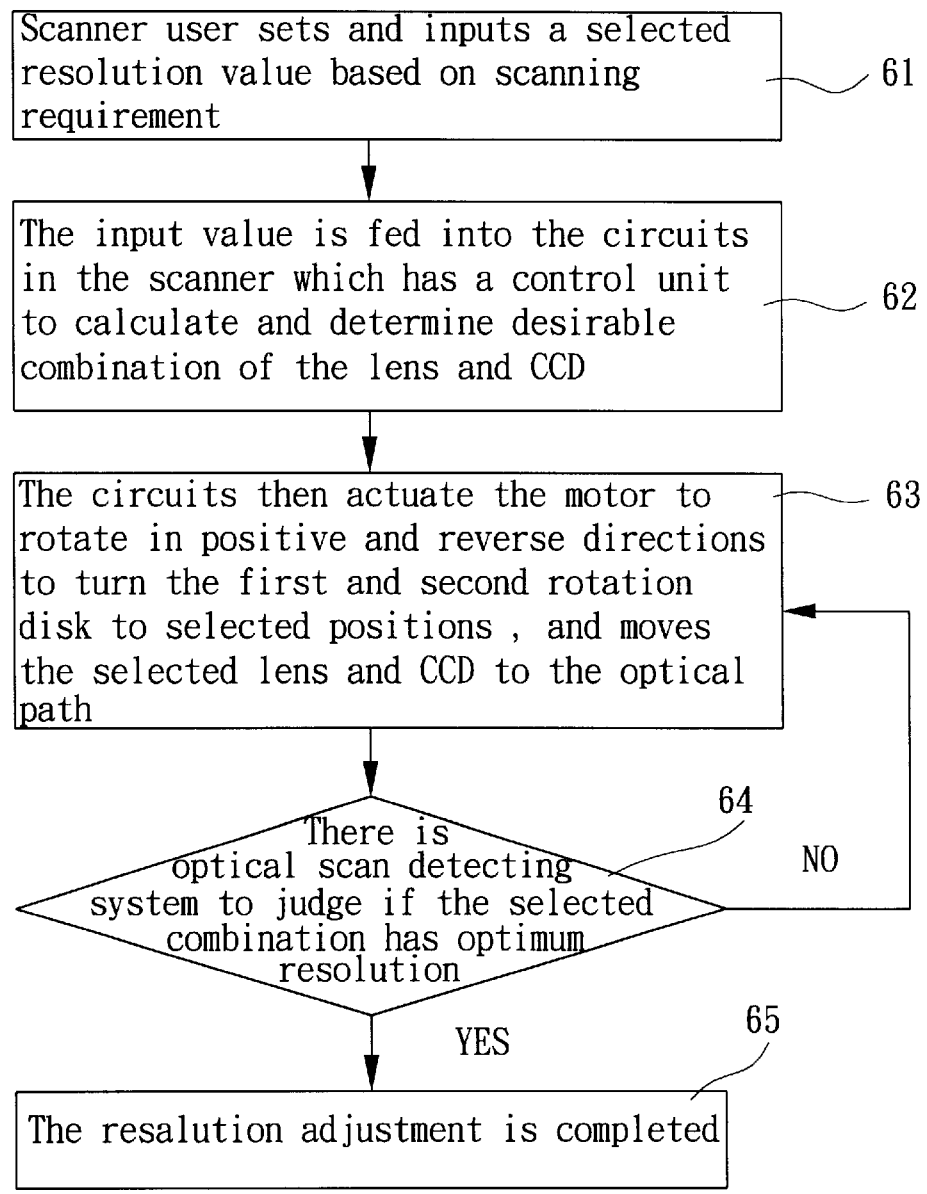
FIG. 5 is the process flow of the method according to the present invention.

FIG. 5 illustrates the process flow of the method of the present invention. First, scanner user sets and inputs a selected resolution value based on scanning requirement (step 61). The input value is fed into the circuits in the scanner which has a control unit to calculate and determine desirable combination of the lens and CCD (step 62). The circuits then actuate the motor to rotate in positive and reverse directions to turn the first and second rotation disk to selected positions, and moves the selected lens and CCD to the optical path (step 63). There is an optical scan detecting system to judge if the selected combination has the optimum resolution (step 64). If the outcome of the step 64 is negative, the process branches back to the step 63 to adjust the lens and CCD positions for selecting another set of lens and CCD combination. If the outcome of the step 64 is positive, the resolution adjustment is completed (step 65). The process set forth above may be executed automatically for adjusting the resolution automatically.

Figure 6:
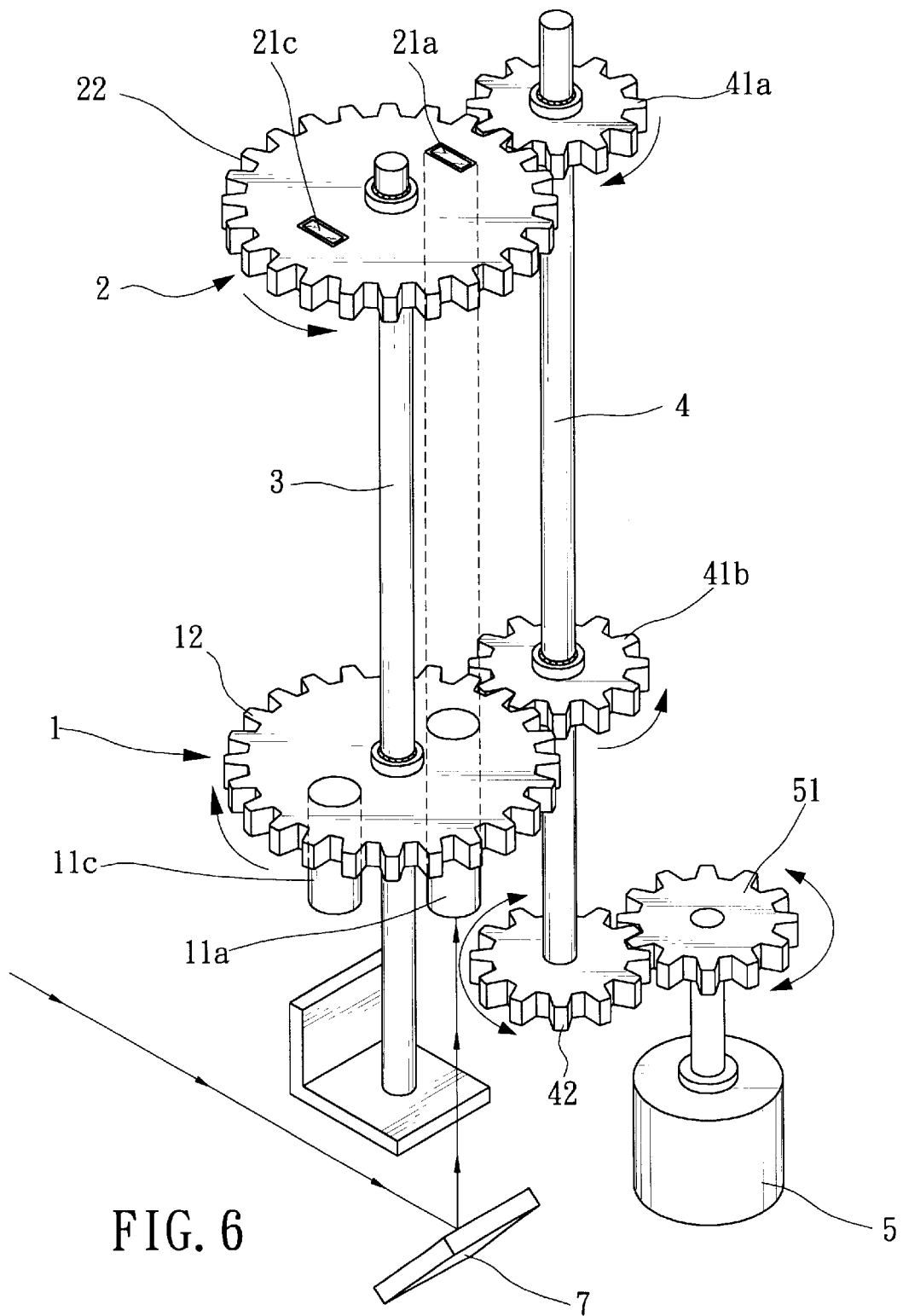
FIG. 6 is a perspective view of another embodiment of the present invention.

FIG. 6 shows another embodiment of this invention. The apparatus according to the present invention has been positioned vertically and normal to the scanning surface. A slant mirror 7 may be added to reflect the optical path for projecting scanning image to a lens 11 and a CCD 21. Such an arrangement may save scanner internal space.

While the preferred embodiment of the invention has been set forth for purpose of disclosure, it would be obvious to those skilled in the art that various other changes and modifications can be made without departing from the spirit and scope of this invention. For instance, the one-way bearings may be located on the spindle to engage with the first and second rotational disk rather than be located on the transmission shaft.

What is claimed is:

1. A changeable resolution apparatus for optical scanner, comprising:

a first rotational disk having a first outer rim and a plurality of lenses of different focuses located therein, a second rotational disk having a second outer rim and a plurality of charge-coupled devices (CCD) of different resolutions located therein, a spindle running through centers of the first and second rotational disk for the first and second rotation disk to rotate thereon, a transmission shaft having two one-way shaft bearings mounted thereon to engage respectively with the first outer rim and second outer rim for turning the first and second rotational disk, and one shaft gear fixedly mounted thereon, and a motor attached with a transmission gear engageable with the shaft gear for driving the transmission shaft to rotate in clockwise or counter clockwise direction.

2. The changeable resolution apparatus for optical scanner according to claim 1, wherein first and second outer rim have respectively a plurality of gear teeth formed thereon for engaging with the shaft bearings.

3. The changeable resolution apparatus for optical scanner according to claim 1, wherein the spindle has one end fixedly engaged with an inner wall of the scanner.

4. The changeable resolution apparatus for optical scanner according to claim 1, wherein the two one-way shaft bearings have opposite rotation directions.

5. The changeable resolution apparatus for optical scanner according to claim 4, wherein the one-way shaft bearing is a one-way transmission means and is firmly engaged with the transmission shaft for transmitting transmission shaft rotation when the transmission shaft rotates in a positive direction, and disengaged with the transmission shaft to form a loose relationship when the transmission shaft rotates in a reverse direction.

6. The changeable resolution apparatus for optical scanner according to claim 1, wherein each one-way shaft bearing includes:

an outer tube having an outer rim which has a plurality of bearing teeth formed thereon for engaging with gear teeth formed on the outer rim of the rotational disk, and a plurality of spaced wedge members located on an inner perimeter surface thereof, an inner tube housed within the outer tube and spaced from the inner perimeter surface having an inner bore engaged with the transmission shaft, and a plurality of rollers located between the outer tube and inner tube, each roller is movably held between a pair of adjacent wedge members such that the inner tube may drive the outer tube to rotate when the rollers being engaged between the inner tube and outer tube.

7. The changeable resolution apparatus for optical scanner according to claim 1, wherein the apparatus is normal to scanning surface for saving scanner internal space.

8. The changeable resolution apparatus for optical scanner according to claim 7 further having a slant mirror to change optical path from horizontal direction to vertical direction.

9. The changeable resolution apparatus for optical scanner according to claim 1, wherein the center of the first rotational disk has a one-way bearing located therein, the first rotational disk is rotationable in only one direction.

10. The changeable resolution apparatus for optical scanner according to claim 1, wherein the center of the second rotational disk has a one-way bearing located therein, the second rotational disk is rotationable in only one direction.

11. A changeable resolution method for optical scanner, comprising the following steps:

a. providing a scanner equipped with a changeable resolution apparatus that has two rotational disks which have respectively a plurality of lenses of different focuses and a plurality of charge-coupled devices (CCD) of different resolutions located therein, a motor for turning the two rotational disks, and a control unit for controlling the motor, b. entering a selected resolution value, c. calculating by the control unit to determine combination of the lens and CCD, d. driving the rotational disks to positions desired based on calculation value, e. completing adjustment.

12. The changeable resolution method for optical scanner according to claim 11, wherein the step c is performed again when the step d outcome does not reach an optimum resolution desired.

13. The changeable resolution method for optical scanner according to claim 11, wherein the step d is performed repeatedly until reaching an optimum resolution desired before going to the step e.

* * * * *